United States Patent
Oosaka et al.

[11] 3,922,060
[45] Nov. 25, 1975

[54] HOLOGRAM RECORDING DEVICE

[75] Inventors: Shigenori Oosaka; Masaru Noguchi; Tsunehiko Takahashi, all of Asaka, Japan

[73] Assignee: Fuji Photo Film Co., Ltd., Minami Ashigara, Japan

[22] Filed: May 6, 1974

[21] Appl. No.: 467,540

[30] Foreign Application Priority Data
May 8, 1973   Japan.............................. 48-50902

[52] U.S. Cl. ............................... 350/3.5; 350/96 B
[51] Int. Cl.² ...................... G03H 1/30; G02B 5/32
[58] Field of Search ........................... 350/3.5, 96 B

[56] References Cited
UNITED STATES PATENTS

| | | | |
|---|---|---|---|
| 3,138,663 | 6/1964 | McNaney | 350/96 B |
| 3,166,623 | 1/1965 | Waidelich | 350/96 B |
| 3,560,071 | 2/1971 | Silverman et al. | 350/3.5 |
| 3,575,485 | 4/1971 | Van Buskirk | 350/3.5 |
| 3,619,033 | 11/1971 | McMahon | 350/3.5 |
| 3,630,594 | 12/1971 | Gorog | 350/3.5 |
| 3,755,677 | 8/1973 | Ooue et al. | 350/3.5 |
| 3,822,087 | 7/1974 | Bolusset et al. | 350/3.5 |
| 3,826,556 | 7/1974 | Graf | 350/3.5 |

OTHER PUBLICATIONS
Takahashi et al., *Laser Focus*, March 1971, p. 29.

*Primary Examiner*—Ronald J. Stern
*Attorney, Agent, or Firm*—Sughrue, Rothwell, Mion, Zinn & Macpeak

[57] ABSTRACT

A hologram recording device for recording information from any position on a hologram recording material as elemental holograms along the circular periphery of a hologram recording material comprising
a laser light source;
a beam splitter for splitting a laser light beam from the laser light source into a first laser light beam and a second laser light beam;
means for directing the first laser light beam from a predetermined direction toward a predetermined position on a hologram recording material;
an optical fiber having an optical element rotatable around two axes at one end there of for directing the second laser light beam from any position toward the predetermined position on the hologram recording material; and
means for rotating the hologram recording material at any angle in the plane of the hologram recording material.

1 Claim, 5 Drawing Figures

HOLOGRAM RECORDING DEVICE

BACKGROUND OF THE INVENTION

1. Field of the Invention

This invention relates to a hologram recording device for quickly and simply recording information from any position on a hologram recording material.

2. Description of the Prior Art

Holograms may be utilized over a broad range of applications not only in the field of recording multiplex information and of recording information in a microscopic area, but also in the field of converting various scanning lines and of reducing and expanding the scanning picture and of producing characters. Thus, important advantages are obtained by using holograms in these fields.

For example, with respect scanning line conversion, a rotary polygonal mirror, an electrooptic element and an acousto-optic element are known as deflection elements. However, disadvantageously in the case of the rotary polygonal mirror, a scanning line of high accuracy cannot be obtained unless the working accuracy is good, the scanning speeds are different at various parts on the scanning lines when scanned on a flat plane, scanning other than linear scanning is technically difficult, and dead time occurs when the light spot passes the edges of the respective faces of the mirror. In the electro-optic and acousto-optic deflection device, disadvantageously an expensive power supply is required, the deflection angle is not very large, and the resolution is low.

Then, the above described disadvantages can be completely eliminated, if spot light sources are, in turn, produced at constant intervals along a straight line and the respective spots are, in turn, recorded as elemental holograms and laser light is, in turn, directed toward a recording holograms composed of a plurality of elemental holograms so as to obtain scanning lines. More particularly, scanning lines of high accuracy and high resolution can be obtained, the dead time can be entirely ignored, and equal scanning speed can be obtained at the respective parts. If the spot light sources are, in turn, generated at any distance along any curve, any shape and length of scanning lines can be obtained easily.

As to the reduction and expansion of the scanning picture, when a lens system is adopted, a very complicated structure must be adopted in order not to produce picture distortion, and accordingly the apparatus is expensive and difficult to align. If a hologram is used as described above, the scanning picture can be easily reduced and expanded. Generation and recording holographically, in turn, of spot light sources has heretofore been conducted frequently, and various methods for simply and quickly recording them have been devised. For example, a method of fabricating rasters of light spots using a Karudan suspended, i.e, gimbal mounted, plane mirror is disclosed in Japanese Patent Laid Open Disclosure No. 5491/72.

SUMMARY OF THE INVENTION

It is, therefore, an object of the present invention to provide a hologram recording device for quickly and simply recording information from any position on a hologram recording material, which may, in turn, generate information including a spot light source and may holographically record it easily and quickly.

According to one aspect of the present invention, a hologram recording device is provided for quickly and simply recording information from any position on a hologram recording material as elemental holograms along the circular periphery of the material, in turn, which comprises means for directing one of two laser light beams which are split by a beam splitter, from a predetermined direction toward a predetermined position on the hologram recording material, optical fibers having an optical element rotatable around two axis at the terminal end for directing another light beam from any position toward the predetermined position on the hologram recording material, a mechanism for moving the optical element in two directions, and a mechanism for rotating the holograms recording material at any angle in the plane thereof.

These and other objects, features and advantages of the hologram recording device for quickly and simply recording information from any position on a hologram recording material according to the present invention will now be described in the following description in conjunction with the accompanying drawings.

BRIEF DESCRIPTION OF THE ACCOMPANYING DRAWINGS

DETAILED DESCRIPTION OF THE INVENTION

Figure 1:
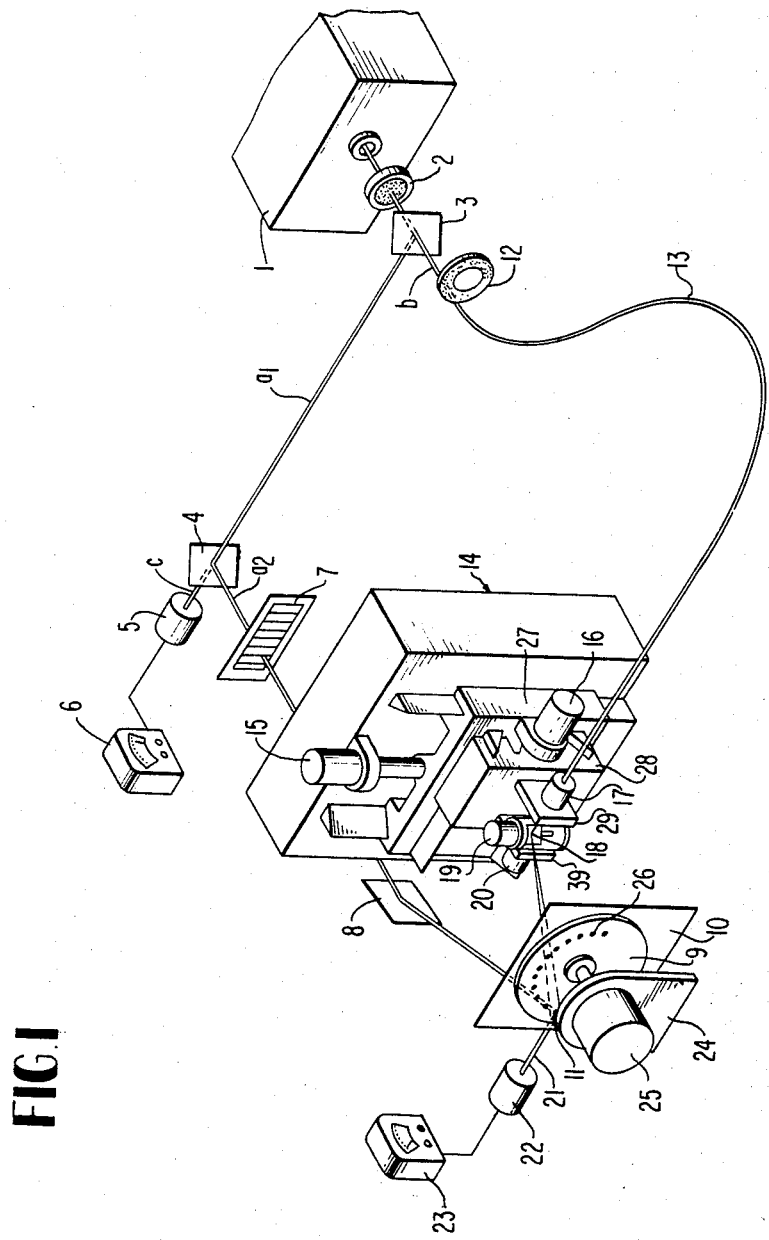
FIG. 1 is a schematic perspective view of one embodiment of the device of the present invention.

In the present invention, the term "beam splitter" designates a device for splitting a light beam using a half-transparent mirror or birefringent material such as calcite.

The term optical fibers designates focus optical fibers such as those commercially available as Cellfoc, trade name, produced by Nippon Electric Company, and a normal flexible light transmitting element such as optical fibers.

As an optical element rotatable around two axis, the Karudan suspended plane mirror as described above, a plane mirror having a mechanism as will be disclosed hereinafter in the example, and a prism can be used and are easily manufactured.

As a mechanism for moving the optical element in two directions, a mechanism movable in the X and Y axis directions such as the platform of a universal projector commercially available can be used, but it is not necessary that movement in the X and Y directions be perpendicular to each other.

The principles whereby the conversion of various scanning lines or reduction and expansion of scanning picture becomes possible using a hologram made by the hologram recording device of the present invention are described below.

A first light beam, designated a reference light beam, is projected from a predetermined direction toward a predetermined position on the hologram recording material, and spot light sources are generated from a predetermined position as a second light beam designated an object light beam, in normal hologram recording, in addition to the above, and these two light beams are projected onto the surface of the hologram recording material so as to record the interference pattern of two light beams in order to thereby produce the elemental hologram. Thereafter the hologram recording material is rotated through at small angle so the interference pattern is no longer superimposed on the previously recorded position, and the spot light sources are, then, moved to the next predetermined position. Subsequently the interference pattern is again recorded so as to produce another elemental hologram. Thus, while the hologram recording material on which the spot light source is recorded as an arrangement of elemental holograms along the circular periphery, in turn is illuminated with laser light having wave-front conjugated with the reference light beam,, if the hologram recording material is rotated, the image of spot light sources can be reproduced at the respective corresponding positions and in the same size and in the same order as that of recording. Therefore, if the position of the spot light source can be freely selected as the object light upon recording, a scanning line of any shape and any length can be obtained, the dead time can be entirely ignored, and the scanning picture can be optionally reduced and expanded.

The resolution where one straight scanning line can be obtained by one revolution of the hologram plate produced by the device of the present invention will now be described hereinafter.

The device of the present invention is based on the recognition that a one spot light source image is obtained from one elemental hologram, the same number of spot light source images can be, in turn, obtained from a number of elemental holograms. Initially the resolution obtained on one straight scanning line is limited by the number of elemental holograms. Assuming that the elemental hologram is recorded on the hologram recording material along the circular periphery of a diameter of 100 mm, using a mask having a slit or pinhole of a width of 150 microns fixed adjacent the hologram recording material, 2,000 elemental holograms are approximately arranged on the circumference. Therefore, when the recorded hologram plate is rotated one revolution, one scanning line composed of 2,000 spot light source images can be obtained, which is sufficient to resolve normal documents. Further, a second reason for the limitation on the resolution on one scanning line is the size of the spot light sources when recording the elemental hologram and the moving accuracy of the spot light source, in turn, but if normal laser light is used, spot light sources of a diameter of about 10 microns can be obtained. In addition, if the platform of the commercially available universal projector is used, movements every 10 microns are possible. Therefore, for example, spot light sources of a diameter of 10 microns are, in turn, generated on a scanning line of a length of 20 mm, and the resolution of 2,000 points can be performed in one scanning line.

With respect to the problem of a variation in the intensity of the object light on the hologram recording material by the variation of the positions of the respective spot light sources, an optical fiber is provided in the vicinity of the slit or pinhole on the hologram mask surface, and light beam led to the light detector so as to measure the intensity, and the density filter inserted into the object light side is adjusted so that a constant intensity is obtained.

The ratio of the reference light to the object light can be slightly varied depending on the variation of the position of the respective spot light sources, but if the variation is within ±20%, experimentally the variation has been proven to have no effect, and accordingly the variation can be ignored. Further, in order to prevent a variation in the exposure due to the variation of the output of the laser light source, a part of the laser light is detected in the vicinity of the outlet of the laser light source, and the exposure time is varied based on the measured value.

In view of the interference, the light path from the outlet of the laser of the object light and reference light to the hologram recording material surface must be substantially equal, that is, for a laser having a normal resonator length, within an error of 10 cm. Therefore, if the object light is introduced using an optical fiber, even if the spot light source is moved to any position, it is possible that the length of light path is substantially equal to the length of light path of the reference light due to the flexibility of the optical fiber.

The advantages such that the light spot sources are holographically recorded along the circumference on the hologram recording material so as to reproduce the light spot source images by rotating the hologram recording material are achieved under the conditions such that while the laser light is illuminated in a predetermined direction, the recorded hologram plate is rotated, and so it can be easily reproduced. The accuracy can be considerably enhanced by rotating the hologram recording material around the same rotary axis of the hologram recording material upon reproducing as that upon recording, and if the difference in the light is made collimate light (a collimate light of 0.5 mm $\phi$ can be easily produced in the laser light). The reproducing light can be illuminated with the simple collimate light because the reproducing light must be illuminated with a light beam having a wave-front conjugated with the reference light beam, and the relative position to the hologram plate can be determined optionally to some extent, and it is convenient upon assembling of the device.

The device of the present invention not only holographically records the spot light sources, but also holographically can record a letter pattern, a coded signal or a picture of narrow definition. However, in case of recording a spot light source, it is preferable to use focus optical fibers: such as Cellfoc, hereinbefore described, while in case of recording letter patterns and the like, it is preferable to illuminate letter patterns by using normal optical fiber. one embodiment of the device of the present invention, numeral 1 is a laser source, and 2 is a shutter. Numeral 3 illustrates a half-transparent mirror which splits the laser light into reference light $a$, and object light $b$. 4 is a half-transparent mirror which functions to split the reference light $a$, into reference light $a_2$ and laser light $c$ for detecting the variation in the output of the laser light. The laser light $c$ is directed toward a light detector 5, and the exposure time of the shutter 2 is set such that the output of the laser light as indicated by a meter 6 results in a constant exposure. 7 is a variable density filter which functions to vary the output ratio of the object light to the reference light. 8 is a planar mirror which functions to direct the reference light $a_2$ toward slit or pinhole 11 in a mask 10 fixed adjacent a hologram recording material 9. In FIG. 1, the distance between the mask 10 and the recording material 9 is shown enlarged for easy understanding.

On the other hand, the object light $b$ is passed through the half-transparent mirror 3, and thereafter it is passed through a variable density filter 12 and is, by an optical fiber, introduced to a predetermined position of a mechanism 14 capable of moving an optical fiber 13 in two directions. The length of the optical fiber 13 is such that the length of the light path from the outlet of the laser light source 1 to the hologram recording material 9 with respect to the object light and the reference light are substantially equal to each other. A mechanism 14 for movement in two directions moves a platform 28 movable along the guide provided on the platform 27 and a platform 27 movable along the guide provided on a stationary platform by rotating knobs 15 and 16 so as to move in two directions the optical element as will be hereinafter described provided on the movable platform 28. Instead of driving knobs 15 and 16, a rotaty angular reduction mechanism such as gears, belts, or a pulse motor responsive to an electric signal can be used. The mechanism 14 for movement in two directions is movable freely in two directions because the optical fiber 13 is flexible. Numeral 17 is a cylinder which has a lens system for focusing the object light b introduced by the optical fibers 13 at the rotary center of the two axis on the rotatable planar mirror 18 around the axis of the two knobs 19 and 20, i.e., for generating a spot light source. That is, the aforesaid planar mirror is constructed such that it is adjustable in the direction of the mirror surface using knobs 19 and 20. This planar mirror can also be used with a rotary angular reduction mechanism such as gears, belts, or a pulse motor responsive to an electric signal as aforementioned.

The object light $b$ is directed toward the slit or pinhole 11 in the mask 10 by the planar mirror 18. The slit or pinhole 11 in the mask 10 functions such that the interference pattern of the spot light source on the planar mirror 18 and the reference light is recorded on the microscopic area on the hologram recording material 9. Since the object light $b$ is focused on the planar mirror 18 and is expanded in light diameter on the mask 10, a part of the object light $b$ can be picked up by fixing the optical fibers 21 in the very vicinity of the slit or pinhole 11, and can be directed toward a light detector 22, and a variable density filter 12 is set such that the output of the object light b at the position of the slit or pinhole 11 in the hologram recording material 9 as indicated by a meter 23 results in a constant exposure regardless of the position of the spot light source.

Numeral 25 is a knob for rotating the hologram recording material 9 in order to, in turn, record the spot light source interference pattern as shown by numeral 26 and is supported by a housing 24. A rotary angular reduction mechanism such as gears, belts, or a pulse motor responsive to an electric signal as aforementioned can also be used for knob 25.

Figure 2:
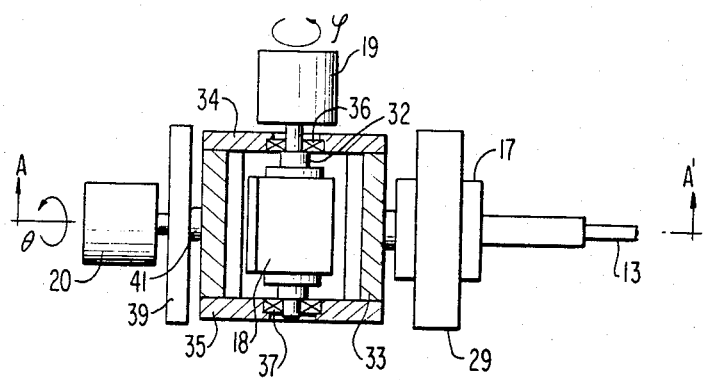
FIGS. 2 and 3 are front and plane sectional views of an essential part of the device of the invention.
Figure 3:
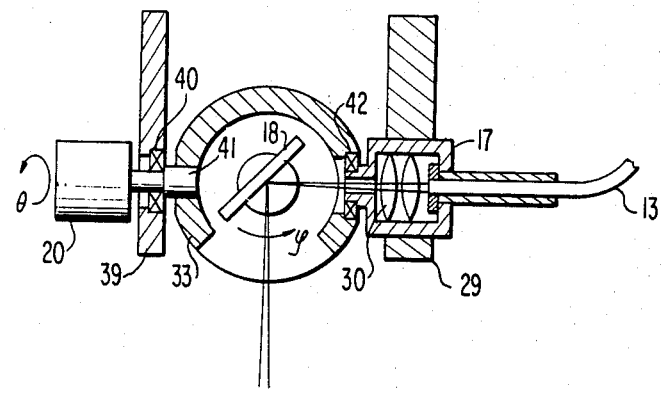

FIG. 2 shows a gimbal mount for rotating mirror 18 around two axes, and FIG. 3 shows sectional view of the device in FIG. 2 as taken along the line A–A'.

The object light introduced by the optical fibers (preferably Cellfoc) 13 is focused at the center of the rotary axis of both directions of $\phi - \theta$ of the planar mirror 18 by a lens system 30 present in cylinder 17 fixed to a projection 29 on the movable platform 28, and then is reflected, and is then directed to a predetermined position of the hologram recording material.

The planar mirror 18 is fixed to integral axis 32 having a knob 19 at one end, and is provided in the interior of a cylindrical housing 33. The integral axis 32 is supported rotatably through bearings 36 and 37 on covers 34 and 35 of the cylindrical housing 33. Therefore, the angular variation in the $\phi$ direction is obtained by rotating the integral axis 32 by means of the knob 19.

An axis 41 having a knob 20 at one end and supported through bearings 40 by a projection 39 of movable platform 39 is fixed to the cylindrical housing 33, while the cylinder 17 is connected through bearings 42 to the cylindrical housing 33. Therefore, the angular variation in the $\theta$ direction is obtained while the cylinder 17 is fixed because of rotating the cylindrical housing 33 integral with the axis 41 by rotating the axis 41 by means of the knob 20.

In operation of the device thus constructed, when the reference light $a_2$ and the object light $b$ are illuminated through the slit or pinhole 11 in the mask 10 onto the recording material 9, the interference pattern of the spot light source is recorded on the recording material. Then, when the recording material 9 is rotated a predetermined angle by the knob 25, the position to be recorded then faces the slit or pinhole 11, and the position of the movable platform 28 is changed by knobs 15 and 16, the planar mirror 18 is adjusted by knobs 19 and 20 so as to direct the object light toward the slit or pinhole, and then the interference pattern of the spot light source light is recorded on the recording material from a direction different from that at which the previous interference pattern was recorded. Thus, when the position to be recorded on the recording material and the position of the movable platform 28 are moved slightly so as to maintain a predetermined relation with each other, in FIG. 1, as designated by 26, a series of interference patterns can be recorded. For example, when the photosensitive material 9 and the mechanism 14 are driven while the spot light source image from the optical fiber 13 is held in stationary relation with respect to one of the positions to be recorded on the photosensitive material 9 relatively, a circular arrangement of the elemental hologram can be obtained enabling a concentration of the light at one point always from different angles. If a plurality of elemental holograms are recorded while the mirror 18 is moved straight by the mechanism 14, equi-speed straight scanning can be conducted upon reproduction by scanning the laser light at a constant speed in the row of elemental holograms recorded in a circle.

Recording of spot light sources has been described, but, as described above, FIG. 4 shows a mechanism rotatable around two axes when a picture of narrow definition or a letter pattern or a code signal is recorded. The operation is entirely the same as that described in reference to FIGS. 2 and 3.

Figure 4:
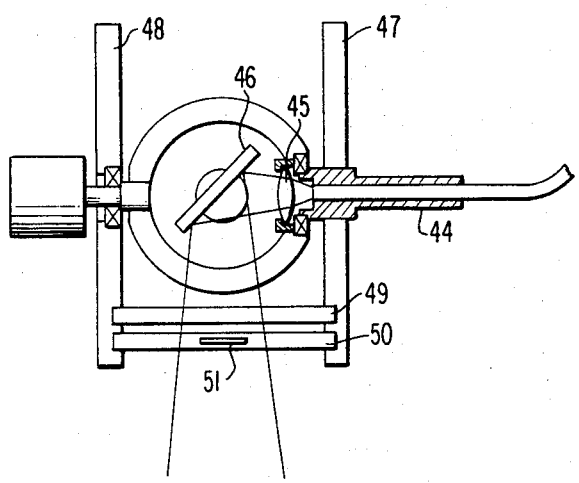
FIG. 4 is a plane sectional view of an essential part of another embodiment of the device of the invention.

The device shown in FIG. 4 corresponds to that shown in FIG. 3. After the object light introduced using an optical fiber 44 is narrowed by a lens 45, the object light is reflected by planar mirror 46 rotatable around two axes, and after the light passes through object 51 replaceable within the projections 47 and 48 of movable platform by diffusion plate 49 and object holder 50, the light is directed toward the predetermined position on the hologram recording material. Therefore, in this case, the reproduced hologram image is formed with high-fidelity at the position of object 51.

Figure 5:
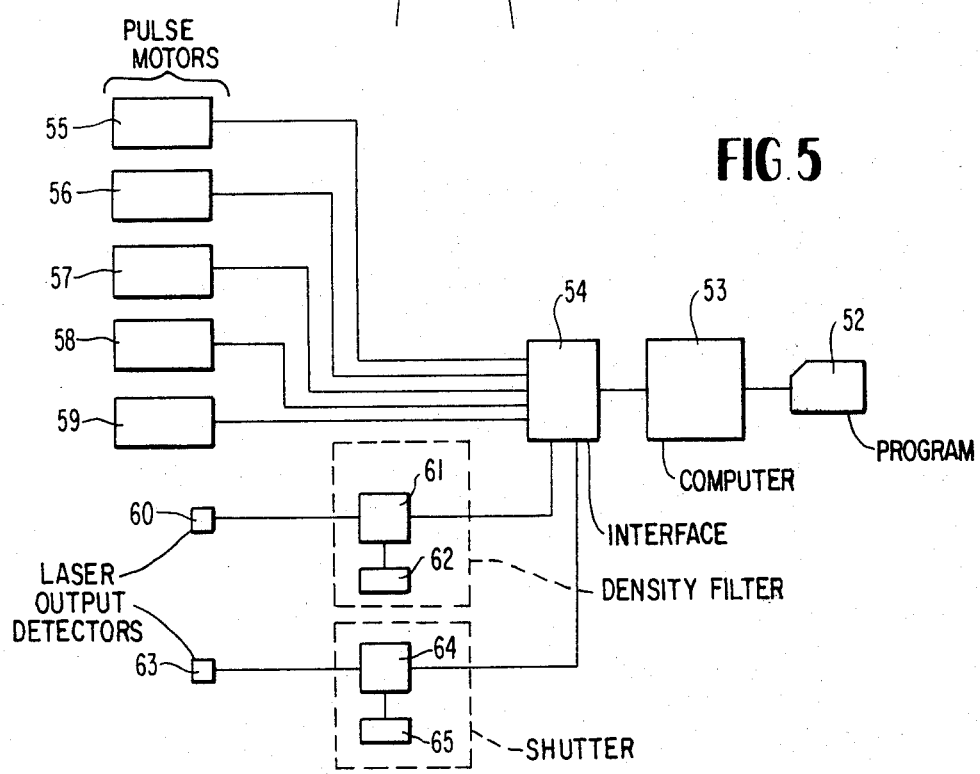
FIG. 5 is a block diagram of the device of the invention wherein the device is automatically operated by a computer.

FIG. 5 shows a block diagram of the device for automatic operation according to instructions from a computer without manually handling the recording device of the present invention.

An interface 54 receiving the calculated result from a computer 53 with program 52 indicates the respective amount of movement to the pulse motors 55 and 56 for movement in two directions of the information to be recorded, to the rotary pulse motors 57 and 58 for movement around two axes, and to pulse motor 59 for rotating the hologram recording material. On the other hand, a density filter 62 is adjusted by a density filter operating device 61 from information from a detector 60 of the laser output variation, and the finishing signal is fed to the interface 54. The exposure time of a shutter 65 is set by the shutter operating device 64 from the information from the output detector 63 of the object light, and after the instruction that the preparations prior to the exposure have been completed is received by the interface 54, then the shutter 65 is operated by the shutter operating device 64.

While the invention has been described in detail and with reference to specific embodiments thereof, it will be apparent to one skilled in the art that various changes and modifications can be made therein without departing from the spirit and scope thereof.

What is claimed is:

1. A hologram recording device for recording a plurality of elemental holograms along the circular periphery of a disc of planar hologram recording material, said device comprising:

a laser light source;

a beam splitter for splitting a laser light beam from the laser light source into a first laser light beam and a second laser light beam;

means for directing said first laser light beam in a fixed predetermined direction onto said hologram recording material at a single predetermined point in the plane of said recording material;

a mirror mounted in a gimbal for rotation about two orthogonal axes, the gimbaled mirror being mounted on a platform mounted for translational movement along two orthogonal directions in a plane;

an optical fiber having two ends, one end fixedly mounted for receiving said second laser light beam and the other end fixedly mounted on said platform for directing said second laser light beam to said gimbaled mirror;

means for rotating said hologram recording material to a plurality of angular orientations, separated by equal angular displacements, in the plane of said hologram recording material, each orientation providing a unique recording location for one elemental hologram; and means for translating and platform to a different position for each elemental hologram and for rotating said mirror to an orientation such that said second laser light beam is directed to said predetermined point to intersect and interfere with said first laser light beam.

* * * * *